United States Patent

[11] 3,589,421

| [72] | Inventor | Maurice Locker<br>86 Cavendish Road, Salford, 8 Lancashire, England |
|---|---|---|
| [21] | Appl. No. | 806,440 |
| [22] | Filed | Mar. 12, 1969 |
| [45] | Patented | June 29, 1971 |
| [32] | Priority | Jan. 7, 1969 |
| [33] | | Great Britain |
| [31] | | 869/69 |

[54] REVERSIBLE GRATER
5 Claims, 4 Drawing Figs.

[52] U.S. Cl. ............................................. 146/180
[51] Int. Cl. ........................................... B02c 19/20
[50] Field of Search ............................... 146/177, 180

[56] References Cited
UNITED STATES PATENTS

| 555,834 | 3/1896 | Taylor | 146/180 |
| 2,601,087 | 6/1952 | Buedingen | 146/180 |
| 1,238,461 | 8/1917 | Tripke | 146/3.5 UX |

Primary Examiner—Willie G. Abercrombie
Attorney—Pearson & Pearson

ABSTRACT: A one-piece, plastic grater for foodstuffs has cutting edges provided at each of two opposed generally flat, horizontal surfaces thereof, the said cutting edges being located around the peripheries of circular through holes in a grater body. According to the nature of the cutting action required, that is to say shredding or grating, so the cutting edges comprise a single curvilinear, toothlike edge at each through hole on one surface or a plurality of angular toothlike edges distributed about the periphery of each such hole on the opposite surface.

An upper or lower peripheral flange seats the grater within the rim of a bowl and both grater and bowl have mating handles for clamping the parts together.

PATENTED JUN29 1971
3,589,421
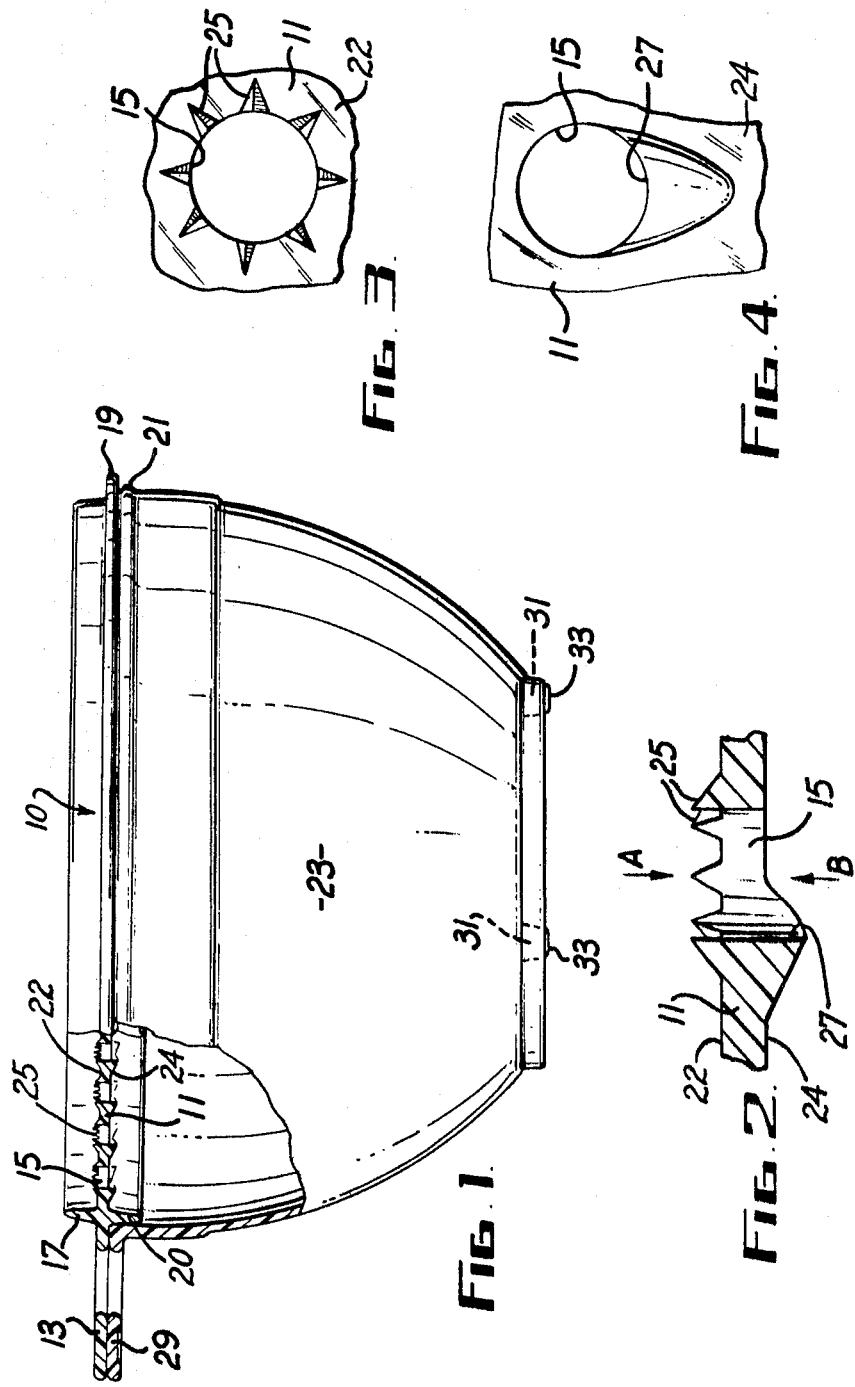
INVENTOR:
MAURICE LOCKER
BY
Pearson & Pearson
ATTORNEYS

REVERSIBLE GRATER

The invention concerns kitchen utensils and has particular reference to a grater/shredder device.

In a prior United kingdom patent there is described and claimed a grater for the treatment of foodstuffs and in the form of a perforated plate with cutting edges on one face, characterized in that the other side of such plate has a continuous rib or shoulder for engagement within or around the rim of a bowl which is covered thereby and forms a receptacle for the fragmented material.

I have now found that I am able substantially to increase the effective life of the arrangement disclosed in said prior patent aforesaid at little extra cost and the object of the present invention is to provide such improved arrangement.

According to the present invention a grater for the treatment of foodstuffs is characterized by the provision of cutting edges at each of two opposite faces of a body part, there being through holes in said body part between such faces and a cutting edge being provided at at least one periphery of each such hole.

Preferably, each through hole has a cutting edge at each end thereof. All of the grating formations will usually be provided at one face of the body part and all of the shredding formations at the other.

A second continuous rib or shoulder is provided for engagement within, or around, the rib of the bowl, so that regardless of whether the upper or lower face is used, the lower continuous rib will anchor the grater on the rim of the bowl while the upper continuous rib will prevent spillage.

In addition, both the reversible grater and the bowl are provided with mating, or registering, integral handles, so that one hand of the operator may clamp the parts together while the other hand performs the grating or shredding action.

The invention will now be described further, by way of example only, with reference to the accompanying drawing illustrating one embodiment thereof and in which:

FIG. 1 is a side elevation, partly in section, of a grater as applied to a bowl;

FIG. 2 is a typical section through the grater, drawn to a larger scale;

FIG. 3 is a view in the direction of arrow A of FIG. 2; and

FIG. 4 is a corresponding view in the direction of arrow B of FIG. 2.

Referring now to the drawing, a greater 10 comprises a flat body part 11 moulded in one piece from high-impact polystyrene or other suitable plastics material as a disc having a coplanar handle 13 extending outwardly therefrom and at one side thereof. A multiplicity of through holes 15 are formed in the body part over substantially the whole of the surface extent thereof, the holes being arranged in staggered rows on such body part.

A first continuous, circular rib, shoulder or flange 20, depends peripherally from the body part 11, and a second continuous, circular rib, shoulder or flange 17 upstands peripherally from the body part 11, one opposite the other, and inwardly of the edge 18 thereof thus to leave a lip 19 at the periphery of the said body part whereby such body part rests on the rim 21 of a basin or bowl 23. The flanges 17 or 20 each appear at one face 22 or at the other face 24 of the body part 11, the faces 22 or 24 being generally flat, horizontal and in parallelism with each other. The flanges thus serve the twofold function of either anchoring the grater within the bowl entirely therearound, against sidewise displacement or of preventing grated or shredded matter from falling from the upper surface of the body part.

At one face 22 of the body part 11 the edges of the holes 15 are provided with upstanding cutting edges 25, such edges being angularly spaced about the hole, as is clearly shown in FIG. 3, and serving to grate or crumble any foodstuff, for example vegetable, cheeses, bread and the like. At the other face 24 the holes are provided with curvilinear, toothlike cutting edges 27, only one such edge being provided for each hole, and all of the cutting edges 27 facing in the same direction and towards the handle 13.

The basin 23 has an integral handle 29 at one side thereof, the said handle being generally coplanar with the top of the basin and extending radially outwardly thereof and being of a like form and dimension to the handle 13 of the grater, to mate, or register therewith, so that a user may manually clamp the parts together to retain the grater flange within the bowl.

Three equally spaced sockets 31 are provided at the underside of the basin to receive rubber or other elastic support pads 33, the bowl resting on such pads and thereby being restrained from slipping upon a table, draining board or other smooth surface when subjected to lateral loading.

In use the grater 10 will be supported on the basin with the appropriate surface 22 or 24 uppermost, and grated or shredded material will pass through the holes 15 into the basin. The uppermost peripheral flange 17 or 20 will preclude any grated or shredded material which has not passed through the holes from falling from the grater, whilst the lowermost flange 17 or 20 will locate the grater on the basin. If desired the uppermost flange can also be utilized to locate a domed lid (not shown) should one be supplied.

I have found that by utilizing the whole of the opposed surfaces 22 or 24 of the device for grating or for shredding, a more satisfactory action is possible in that the permitted working stroke is longer. Furthermore, in view of the greater number of cutting edges and larger effective area, the rate of wear of the device is reduced and hence a longer effective life is possible.

Whilst in the embodiment described the body part is of circular form, in no way is the invention limited to body parts of such shape since other shapes, for example rectangular, may be preferred in some circumstances, the basin, if indeed a basin is used, being of a corresponding shape to receive the body part. Again, the invention is not restricted to the provision of cutting edges for grating and cutting edges for shredding each on opposite is seen to lie in providing a one-piece, moulded, reversible, disclike grater with both an upper and a lower peripheral rim and a generally flat horizontal body part with a multiplicity of spaced, circular through holes therein and at the grater having through holes therein and at the periphery of which cutting edges appropriate to their intended function are provided, a through hole having a cutting edge or edges at one or both ends thereof or not as preferred. I may prefer, in some circumstances, to provide a surface for grating and a surface for shredding at each fact of the body part, each such surface extending, for example, over a semicircular part of the total surface and lying at one side of a diameter which passes through the handle.

To facilitate use of the device in an inclined position and separately from the basin a flat (not shown) may conveniently be provided at that edge of the body part opposite to the handle.

What I claim is:

1. In combination with a bowllike receptacle having an upper rim of predetermined inside diameter;
    a foodstuff grater for detachable mounting on said rim of said receptacle, said grater comprising:
    a generally disclike, one-piece, body of plastic material having an upper face and a lower face, each adapted to peripherally rest on said rim to cover said receptacle;
    a first, continuous, circular, flange depending from said lower face and an opposed, second, continuous, circular flange upstanding from said upper face, each said flange fitting within the rim of said receptacle to anchor said grater entirely therearound when the opposed flange encircles the upper face of said grater to prevent spillage outside said receptacle, said flanges being of uniform cross section and outlining predetermined, parallel planes;
    a multiplicity of generally hollow cylindrical through holes spaced apart on said body to permit foodstuff to fall through into said receptacle, and outwardly projecting cutting edges of predetermined configuration integrally formed in the material of said body surrounding said holes on each said face, said projecting cutting edges being entirely within the planes of said flanges, and completely encircled by said flanges.

2. A kitchen utensil comprising a double surfaced, reversible foodstuffs grater and a bowllike receptacle having a sidewall and cooperable with said grater to receive a comminuted material therefrom, said grater including:
- a one-piece, disclike body part having upper and lower, faces generally in parallelism with each other;
- a multiplicity of through holes in said body part;
- an integral, toothlike cutting edge at least partially encircling the rim of each end of at least some of said holes, and extending outwardly from the adjacent upper or lower face in which formed; and
- an upper continuous peripheral flange upstanding from proximate the periphery of said upper face and a lower, continuous, peripheral flange depending from proximate the periphery of said lower face, each said flange being receivable within the sidewall of said receptacle for detachably affixing said grater entirely therearound against sidewise displacement from said bowl.

3. A grater as claimed in claim 2 wherein said grater body part has a handle extending outwardly from an edge thereof and said bowllike receptacle likewise has a handle thereto adjacent that on the grater body and adapted to underline the same.

4. A combination as specified in claim 1 plus:
- an integral handle extending horizontally outward from said grater body at the periphery thereof;
- and a corresponding integral handle extending horizontally outward from the rim of said receptacle to mate therewith;
- whereby a user may clamp said grater handle against said receptacle handle with one hand to prevent displacement of said grater, while using the other hand for grating or shredding foodstuffs on said grater.

5. A combination as specified in claim 1 wherein:
- all of the holes in one said face have a plurality of integral, angular-shaped toothlike cutting edges projecting therefrom and angularly spaced therearound and
- all of the holes in the other said face have a single integral curvilinear toothlike cutting edge projecting therefrom.